United States Patent [19]

Wilson

[11] 4,304,403
[45] Dec. 8, 1981

[54] FLAG FOOTBALL BELT DEVICE AND COUPLING THEREFOR

[76] Inventor: Porter C. Wilson, Box 11010, Tucson, Ariz. 85734

[21] Appl. No.: 22,239

[22] Filed: Mar. 20, 1979

[51] Int. Cl.³ .................................................. A63B 67/00
[52] U.S. Cl. ....................................... 273/55 C; 24/231; 24/310; 403/279
[58] Field of Search ................. 273/55 C, 1 R; 46/26, 46/16, 29, 31; 24/231, 415 S, 255 SL, 73 MC, 73 S, 3 K; 403/57, 61, 76, 78, 122, 132, 143, 279

[56] References Cited

U.S. PATENT DOCUMENTS

| | | | |
|---|---|---|---|
| 3,251,109 | 5/1966 | Wilson et al. | 273/55 C |
| 3,345,070 | 10/1967 | Wilson et al. | 273/55 C |
| 3,579,745 | 3/1969 | Wilson | 273/55 C |
| 3,648,404 | 3/1972 | Ogsbury | 46/29 |
| 4,159,592 | 7/1979 | Gabriel et al. | 46/26 |

*Primary Examiner*—Richard C. Pinkham
*Assistant Examiner*—T. Brown
*Attorney, Agent, or Firm*—Millen & White

[57] ABSTRACT

An improved flag-tag football device comprising a novel ball and socket coupling assembly for detachably securing a first member to a second member in environments where it is desirable to provide predetermined resistance to pull-away detachable separation of the members in use, such as, for example, in flag-tag games; the coupling including an essentially rigid female socket part internally shouldered around the open end thereof and a male ball part rendered resilient by a closed transverse slot to permit inward deformation of the ball cheeks during coupling with the socket part and then outward expansion thereof at least toward predetermined normal configuration for trapping the ball part in the socket part to resist but not prevent separation of the coupling parts by normal pull-away tension during use, when the center axes of the coupling parts are in approximate general alignment.

10 Claims, 3 Drawing Figures

FLAG FOOTBALL BELT DEVICE AND COUPLING THEREFOR

BACKGROUND OF THE INVENTION

This invention relates to a novel flag-tag device and to an improved ball and socket coupling for such devices.

In prior flag type games, a flag has been attached to the belt or other waist encircling arrangement of a wearer by releasable coupling parts in such manner that the flag is pulled away from its attachment to the belt by a predetermined pull-away tension on the belt serving to detach the flag coupling part from the cooperative belt coupling part. Usually these coupling parts have been designed as cooperating ball and socket devices, as shown in U.S. Pat. Nos. 2,966,356; 3,251,109; 3,345,070; and 3,579,745. Such coupling parts are usually formed of plastic material. It has been found that where resiliency of the socket part is relied upon for the attachment and release of the ball part, the resiliency varies under different conditions of climate and particularly in colder climates, where the socket part may shrink to such a degree that the pullaway force to separate the coupling parts becomes excessive. Enlarging the socket or female part as compensation also results in non-uniform performances of the coupling in varied climates.

Bifurcating the ball does not fully solve this problem and reduces the durability of the ball.

Another problem associated with the prior art ball and socket designs for the coupling portion of the device is the excessive force required to re-insert the ball in the socket during the game, which is particularly a problem for younger players and can delay the game, even with older players.

OBJECTS OF THE INVENTION

With the above in mind, it is an object of this invention to provide an improved ball and socket design for couplings which are repeatedly coupled and uncoupled manually.

Another object is to provide a ball and socket coupling which can be manually uncoupled with a predetermined pulling force which does not vary substantially from hot to cold weather.

Another object is to provide a ball and socket coupling wherein the ball is formed of a resilient plastic and the socket is essentially rigid.

Another object of the invention is to provide a ball and socket coupling device with the relatively more massive ball part slotted for resiliency in attachment and detachment relative to the female socket part.

Another object of the invention is to provide a coupling device substantially of the above type wherein the slotted ball part is constructed to resist any tendency for the opposed ball segments to break away from one another while yielding to permit attachment and detachment relative to the female coupling part.

A further object of the invention is to provide a ball and socket coupling device wherein the relatively interengageable surfaces therebetween are shaped to facilitate manipulative attachment of the parts with less manual force than the predetermined force required for separation of the parts in normal use.

Yet another object is to provide a novel flag football belt device.

These and other objects and advantages of the invention will be apparent from the hereindescribed invention.

SUMMARY OF THE INVENTION

In its coupling aspect, this invention relates to a ball and socket coupling for detachably securing a first member to a second member; and comprising a female socket part formed of a substantially rigid material and internally shouldered around the open end thereof and a male ball member formed of a substantially rigid material and having an internal open ended slot therein to impart resiliency to the cheeks of the ball in attachment and detachment thereof relative to the socket part.

In its flag football belt device aspect, this invention relates, for use in a flag tag game, to a support member for attachment to the belt of a player and having an outwardly angled substantially rigid socket member internally shouldered around the open end thereof; and a ball member with an open-ended through slot providing resiliency to the ball cheeks for permissive manual attachment and detachment thereof relative to the socket member and having an attachment member positioned by the said angled portion outwardly of the belt of a player to secure the end of a game flag or similar game piece.

DETAILED DESCRIPTION OF THE INVENTION

According to the present invention, the socket or female coupling part may be made substantially rigid and the ball part is given the desired flexibility for attachment and detachment from the socket part for more consistency in operation in game playing or in other environment where it is desired to have a reasonably accurate resistance to pull-away separation of the parts regardless of varied conditions of climate.

DESCRIPTION OF THE DRAWINGS

The above and other objects of the invention will be apparent and will be hereinafter more fully pointed out in the following description of the embodiment shown in the accompanying drawings, in which.

Figure 1:
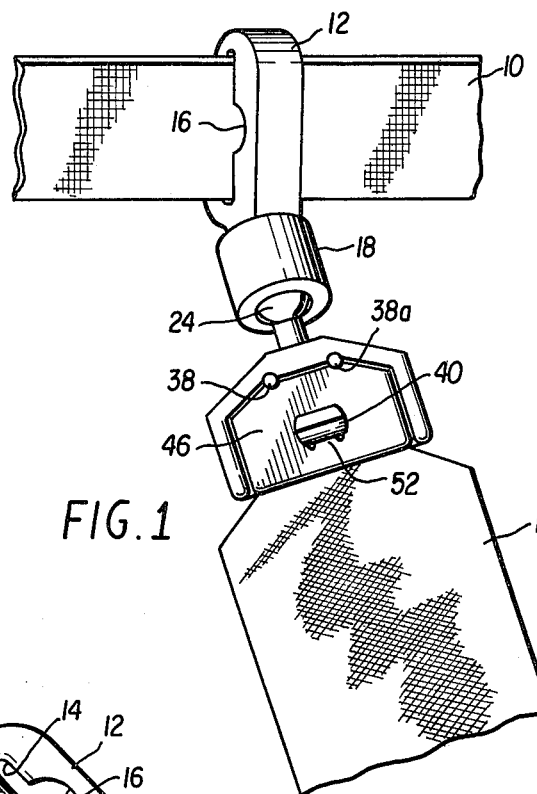
FIG. 1 is a perspective view of the coupling parts assembled for game playing with the belt and flag fragmentarily shown.
Figure 2:
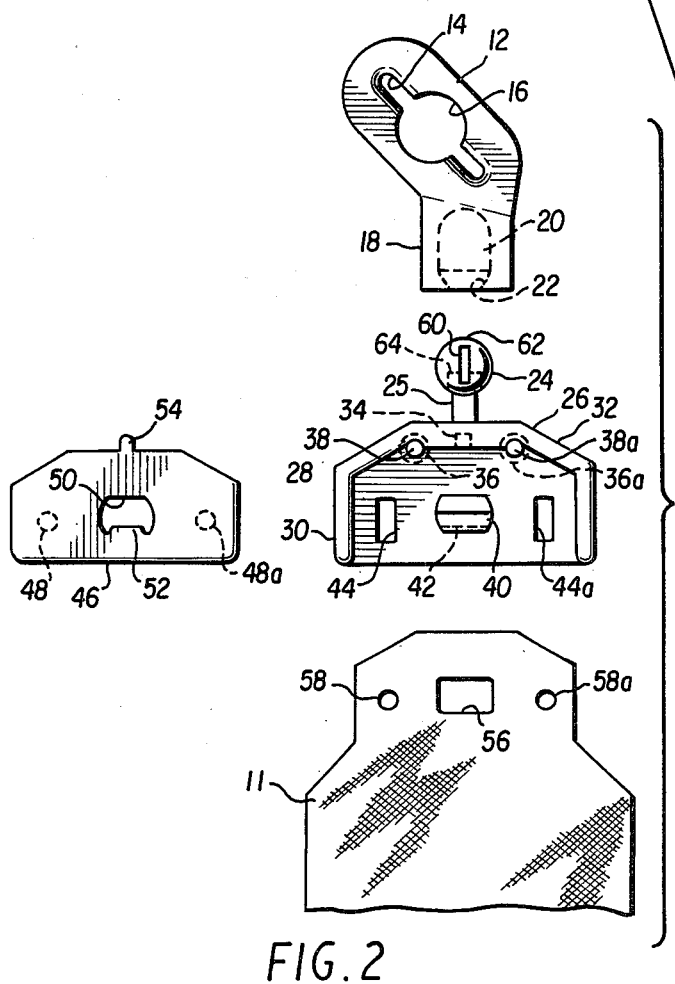
FIG. 2 is an exploded view of the coupling parts and flag end in elevation.

With reference to the accompanying drawings, the composite device is shown attached to the belt 10 of a wearer in readiness for playing the simulated football or other game employing a flag-tag. For a detailed description of such games and sililar prior art flag-tag devices, see the above-cited patents, whose disclosures are incorporated by reference. The belt-attached support is in the form of a strap-like support 12 having a central elongate aperture 14 through which the belt is inserted. There may be provided an enlarged central portion 16 of the aperture to facilitate insertion of the belt 10 therein. The support 12 includes a cylindrical portion 18 angled outwardly and downwardly and centrally apertured to provide a ball-receiving socket 20 terminating around the open end in an internal annular shoulder 22. This composite support 12 and angled portion 18 are substantially rigid and may be formed of plastic or metal. The offset disposition of the central axes of these portions is to initially offset the attached portion of the flag 11 away from the belt of the wearer. The rounded top and narrow width of support 12 allows upward rolling and lateral turning to assure ball release always in straight alignment with socket housing 18.

A resilient ball element 24 is carried at the end of a stem 25 which in turn is carried by a recessed housing 26 including a closing end wall 28 from which project side walls 30, 30a and a top wall 32 of truncate cross section having at the center thereof a vertical opening 34 for assembly purposes to be described. The top wall 32 also includes openings 36, 36a formed during the molding process to leave similarly spaced downward latching nipple-like projections 38, 38a for assembly purposes. Between the side walls 30, 30a, the end wall 28 is provided with a rearward projection 40 having a downwardly projecting depending shoulder 42 for assembly purposes and also with spaced vertical slots 44, 44a, one on each side of the projection 40 to also assist in assembly, as will be described.

A locking or latching flat plate 46 is shaped in complement to the recess in the housing 26 and is provided with rearwardly or inwardly projecting pins 48, 48a, spaced to pass through the slots 44, 44a, respectively, when assembled, and with an opening 50 complemental to the shape of the projection 40 but with an upstanding tongue 52 to snap beneath the shoulder 42 on the projection 40 in assembled position. Plate 46 is also provided with a projecting pin 54 at the upper edge to cooperate with the recess or opening 34 in the top wall of the housing 26.

Figure 3:
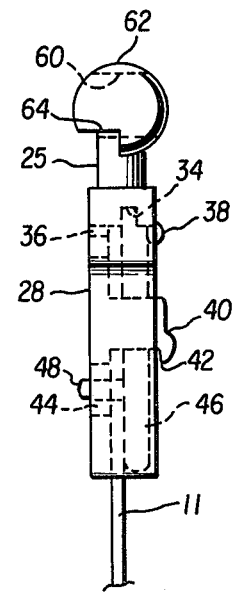
FIG. 3 is an enlarged side view of the parts coupled as shown in FIG. 1.

The flag 11 is formed of suitable fabric or other flexible material for use in the game environment and includes an end which is cut to complement the shape of the housing recess. For the purpose of snug fitting within the housing recess, this shaped end of the flag is apertured at 56 and 58, 58a to receive therethrough, respectively, the projection 40 and the pins 48, 48a. When so positioned, the locking plate 46 is fitted within the housing recess to clamp the shaped flag end within the housing and against the housing wall 28. In so relatively positioning the various elements, the pin 54 of the plate is first fitted into the opening 34 of the housing with the edge of the plate forced behind the latching projections 38, 38a and the plate is then forced downwardly toward housing wall 28 with the pins 48, 48a passing through the corresponding openings 58, 58a in flag 11 and the slots 44, 44a in wall 28 and with the tongue 52 snapping beneath the shoulder 42 depending from the housing projection 40, as shown in FIG. 3.

The housing 26 and ball 24 may be formed of any suitable substantially rigid material, preferably a non-brittle plastic having high impact strength. Because of the rigidity of this material, the ball element 24 is provided with an internal open ended transverse slot 60 therethrough. This slot may be formed during the molding process or by transverse milling, with a portion of the ball material welded or otherwise flowed to form a bridge portion 62 closing the slot at the outer extremity of the ball, or this bridge portion may be the remnant material when the slot is cut transversely through the ball. In either case, the side cheeks of the ball on either side of the slot are rendered inwardly compressible by the slot for assembly and for resilient mounting of the ball element within the socket 20 for free swiveling therein but releasable for detachment under pulling stress when playing a flag-type game. The ball element is further configured to facilitate ready re-attachment in the socket during game playing, and in other environments where ease and rapidity of assembly are desirable but with maintained resistance to separation of the ball and socket. To this end, the ball element is cut away or flattened at the bottom of a hemispherical portion adjacent the bottom of the slot 60 to provide a generally semi-circular shoulder 64, thus reducing the transverse extent of the lower spherical portion of the ball element. With this arrangement for assembly of the ball in the socket, the socket and ball element may be positioned with the center axes thereof approaching ninety degrees and the shoulder 64 entering the socket opening to engage behind the socket shoulder 22 and the adjacent external portion of the shoulder in abutment with the stem of the ball element. Then, relatively shifting the ball and socket toward positions with the center axes thereof in alignment, the engagement between the abutting portions of the shoulders 64, 22 will act as a fulcrum with increased mechanical level advantage to position the ball element within the socket. When so positioned, and with normal pull on the flag or other attachment in normal use with the center axes aligned, substantially the predetermined resistance is offered to relative separative therebetween, as in game playing or other instances, where a pull on the ball-attached element is to be resisted up to a certain degree of force but at the same time permitting rapid and easy re-attachment of the ball into the socket if a predetermined force has caused separation therebetween. Thus, in flag-tag game playing, a detached flag may be reattached to its belt conjunction by the player with little effort during the game and in other environments where rapid re-attachment of some element to another may be manipulatively accomplished with great facility and with less force than the normal force required for separating the coupling parts when acially in general alignment in normal use. Thus, the ball cheeks present the substantially maximum diameter thereof to the socket shoulder for resisting separation by pull-away tension in use.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a flag tag game device having a support member for attachment thereof to the belt of a player and a game piece detachable from the support member by a ball and socket coupling having a resilient ball member and a substantially rigid socket member having a construction defined by a shoulder in the opening thereof which provides resistance to manual detachment of the ball and socket members, the improvement wherein the ball member is rendered resilient by a slot extending therethrough which is closed in a direction along an axis of said ball which is substantially in alignment with the axis of the socket defined by the direction in which said ball is inserted into said socket and said slot being open at both ends in the direction transverse to said axis, said ball member further having a cut-away section therein providing a shoulder cooperative with the shoulder in the socket member in facilitating the coupling of the ball member to the socket member by movement from a position wherein said axes of the ball and socket members are relatively angled at about ninety degrees with said shoulders in engagement into a coupled position with the axes of the ball and socket members in general alignment.

2. A game device as claimed in claim 1, wherein the socket member is mounted on the support member and the game piece is attached to the ball member.

3. A game device as claimed in claim 2, wherein the socket member angularly projects outwardly and downwardly from the support member when the latter is attached to the belt of a player and the game flag or similar game piece is detachably joined to the ball member by an attachment member.

4. A game device as claimed in claim 3, wherein the attachment member comprises a recessed housing to receive the end of a flag, and wherein there is provided a clamping plate secured within the housing recess to clamp the flag end therein.

5. A game device as claimed in claim 4, wherein the plate and housing are provided with mutually interfitting projection and recess means for interlocking the plate and housing with the flag end clamped therebetween.

6. In a flag tag game device having a first member securable to a player and a second member with a flag attached thereto detachably securable to the first member by a ball and socket coupling, the socket part of the coupling being substantially rigid and internally shouldered around the open end thereof to provide a constriction therein which provides resistance to manual coupling or uncoupling of the ball and socket members, and the ball part of the coupling being deformable so as to permit passage thereof past the constriction during coupling or uncoupling of the ball and socket coupling, the improvement wherein the ball member is rendered resilient by a slot therethrough which is closed in a direction along an axis of said ball which is substantially in alignment with the axis of the socket defined by the direction in which said ball is inserted into said socket, said slot being open at both ends in the direction transverse to said axis, whereby the force required to uncouple the ball and socket coupling by urging the resilient ball past the constriction does not vary substantially from hot to cold weather.

7. A game device as claimed in claim 6, wherein the ball member has a cut-away section therein providing a shoulder cooperative with the shoulder in the socket member in facilitating the coupling or uncoupling of the ball member to the socket member by movement from a position wherein said axes of the ball and socket members relatively angled at about ninety degrees with said shoulders in engagement into a coupled position with the axes of the ball and socket members in general alignment.

8. A game device as claimed in claim 7, wherein the ball member is mounted on a stem which is an integral part of an attachment member to which the flag is detachably mounted.

9. A game device as claimed in claim 8, wherein the socket member is an integral part of a support member for attachment thereof to the belt of a player and the socket member angularly projecting outwardly and downwardly from the support member when the latter is attached to the belt of a player and the game flag is detachably joined to the ball member by an attachment member.

10. A game device as claimed in claim 8, wherein the cut-away section in the ball member intersects the slot therein.

* * * * *